United States Patent [19]
Richardson

[11] Patent Number: 5,858,148
[45] Date of Patent: Jan. 12, 1999

[54] WEEPING HOSE

[75] Inventor: Robert L. Richardson, Cookshire, Canada

[73] Assignee: Mercedes Textiles Limited, Kirkland, Canada

[21] Appl. No.: 902,301

[22] Filed: Jul. 29, 1997

Related U.S. Application Data

[62] Division of Ser. No. 592,447, Jan. 26, 1996, Pat. No. 5,676,783, which is a division of Ser. No. 181,909, Jan. 18, 1994, Pat. No. 5,500,262.

[30] Foreign Application Priority Data

Jan. 19, 1993 [CA] Canada .................................. 20875763

[51] Int. Cl.$^6$ ...................................................... B05B 7/22
[52] U.S. Cl. ............... 156/149; 264/171.12; 264/171.26; 427/235; 427/277
[58] Field of Search ..................................... 156/149, 148, 156/305; 264/171.12, 171.26, 209.1; 239/34, 145; 138/126; 427/235, 277

[56] References Cited

U.S. PATENT DOCUMENTS

| 4,153,080 | 5/1979 | Murray | 239/145 |
|---|---|---|---|
| 4,276,908 | 7/1981 | Horne | 156/149 |
| 4,668,318 | 5/1987 | Piccoli | 156/149 |
| 4,668,319 | 5/1987 | Piccoli | 156/149 |
| 4,738,735 | 4/1988 | Joncker | 156/148 |
| 5,047,200 | 9/1991 | Harcourt | 156/149 |
| 5,229,056 | 7/1993 | DeMeyer | 264/171.12 |

*Primary Examiner*—Daniel Stemmer

[57] ABSTRACT

A method of manufacture of an interior coated weeping hose comprised of a warp yarn and filler yarn and having an interior coating comprising the steps of fastening a number of yarns longitudinally to the interior of said hose, applying a coating to the interior of said hose, pulling said hose, longitudinally disposed interior yarns and coating over mandrel to force the coating onto the interior surface of said hose other than the interior surface beneath the longitudinally disposed interior yarns, and removing the longitudinally disposed interior yarns from the interior of the hose.

1 Claim, No Drawings

WEEPING HOSE

This is a divisional of application Ser. No. 08/592,447 filed on Jan. 26, 1996, now U.S. Pat. No. 5,676,783, which is a divisional of Ser. No. 08/181,909, filed on Jan. 18, 1994, now U.S. Pat. No. 5,500,262.

This invention relates to a weeping hose, a hose containing apertures allowing the controlled release of water through fibers from the inside of the hose to the outside of the hose to keep the outside of the hose wet. One use of weeping hoses is as a fire hose where it is desirable to keep the outside of the hose wet to protect the outside of the hose from hot objects such as embers.

There are a number of methods in existence for creating weeping hoses. In one method the hose is perforated along its length to cause a series of apertures in the walls of a hose. One problem with perforation is that the points of the perforator sometimes create a space between warp and filler yarn creating an aperture through which the water will spray out as opposed to weeping out between the fibers of the yarn as desired.

In another method, the exterior of a hose is coated with an elastomer or other coating. A scraper is then pulled along the hose creating lines on the exterior of the hose along which the coating has been removed. The hose is then turned inside out. When water is forced through the hose, water has access to the interior fibers of the hose along the lines scraped in the coating, the water weeps through the interior fibers to wet the outside of the hose.

One of the problems with the prior art was that in the perforation process holes were occasionally created between fibers in the wall of the hose which allows water to shoot through the openings in the wall of the hose rather than weep through the fibers in the wall of the hose. The problem with the scraping of the elastomer or other coating on the exterior of the hose is that the hose must subsequently be turned inside out so that the elastomer is on the inside of the hose.

In U.S. Pat. No. 4,738,735 there is disclosed a method of extruding elastomeric material on the inside of a hose inside a loom. Following the extrusion of elastomeric material on the inside of the hose, the hose and elastomeric material are pulled through a mandrel which presses the elastomeric material against the inside of the hose.

The problems of the prior art in creating access through the elastomer to the fibers on the inside of the hose so that the water may weep through the fibers while avoiding puncturing of the walls with sharp objects were overcome as disclosed in U.S. Pat. No. 5,500,262 by weaving a hose in a loom having a first warp yarn and a second warp yarn having different diameters, the first warp yarn having a substantially greater diameter than the second warp yarn. Elastomeric material is applied to the inside wall of the fire hose prior to passing the inside of the fire hose and elastomeric material over a mandrel.

The inner circumference of the substantially greater diameter warp yarn on the interior wall of the hose where the warp yarn of greater diameter crosses over the filler yarn are cleared of elastomer leaving uncoated portions on the substantially greater diameter warp yarns on the interior of the hose through which the hose will weep when the hose is put in use.

Another method of manufacture of elastomer lined weeping hose comprises the steps of weaving a hose from warp and filler yarns in which the warp yarns may be of the same diameter. A number of yarns are fastened longitudinally to the interior of the hose and an elastomer lining is applied to the interior surface of the hose. The interior of the hose including the longitudinally disposed interior yarns and elastomer coating are pulled over a mandrel. The mandrel presses the elastomer against the interior of the hose except that portion of the interior of the hose beneath the longitudinally disposed interior fibers in which area the longitudinally disposed interior fibers are pressed directly against the interior of the hose. The longitudinally disposed interior fibers are later removed leaving narrow longitudinally disposed uncoated surface on the interior of the otherwise coated interior surface of the hose. When water is applied to the interior of the hose, the hose will weep through the narrow longitudinally disposed uncoated surface on the interior of the hose.

I claim:

1. A method of manufacture of an interior coated weeping hose comprised of warp yarn and filler yarn and having an interior coating, said method comprising the steps of:

fastening a number of yarns longitudinally to the interior of said hose;

applying a coating to the interior of said hose; pulling said hose, longitudinally disposed interior yarns and coating over a mandrel to force the coating onto the interior surface of said hose other than the interior surface beneath the longitudinally disposed interior yarns;

and removing the longitudinally disposed interior yarns from the interior of the hose.

* * * * *